(12) United States Patent
Hawk

(10) Patent No.: US 6,195,492 B1
(45) Date of Patent: Feb. 27, 2001

(54) ELLIPTICAL CORE FIBER WITH AXIALLY DECREASING ASPECT RATIO AND METHOD

(75) Inventor: Robert M. Hawk, Pawleys, SC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/155,576
(22) PCT Filed: Apr. 11, 1997
(86) PCT No.: PCT/US97/06001
§ 371 Date: Dec. 16, 1998
§ 102(e) Date: Dec. 16, 1998
(87) PCT Pub. No.: WO97/40408
PCT Pub. Date: Oct. 30, 1997

Related U.S. Application Data

(60) Provisional application No. 60/015,998, filed on Apr. 23, 1996.

(51) Int. Cl.[7] .................................... G02B 6/16
(52) U.S. Cl. ............................. 385/123; 65/385
(58) Field of Search .................. 385/11, 123–128; 65/385, 403, 405, 427, 428

(56) References Cited

U.S. PATENT DOCUMENTS

| | | | |
|---|---|---|---|
| 4,179,189 | * 12/1979 | Kaminow et al. | 385/128 |
| 4,415,230 | * 11/1983 | Keck | 385/127 |
| 5,180,410 | *  1/1993 | Berkey | 65/403 |
| 5,351,323 | *  9/1994 | Miller et al. | 385/28 |
| 5,455,879 | * 10/1995 | Modavis et al. | 385/33 |

* cited by examiner

Primary Examiner—John D. Lee
(74) Attorney, Agent, or Firm—William J. Chervenak

(57) ABSTRACT

A single-mode elliptical core optical fiber (15) suitable for the transmission of solitons has a core aspect ratio that changes along the length of the fiber to provide a fiber dispersion that monotonically decreases along the fiber from one end thereof to the other. The fiber preform (30) is drawn from a draw blank (10) having a glass core (11) surrounded by cladding glass (12) and having apertures (13) that are diametrically opposed with respect to the core (11). The cross-sectional area of the void space within the apertures (13) varies with respect to the longitudinal distance along the apertures.

13 Claims, 5 Drawing Sheets

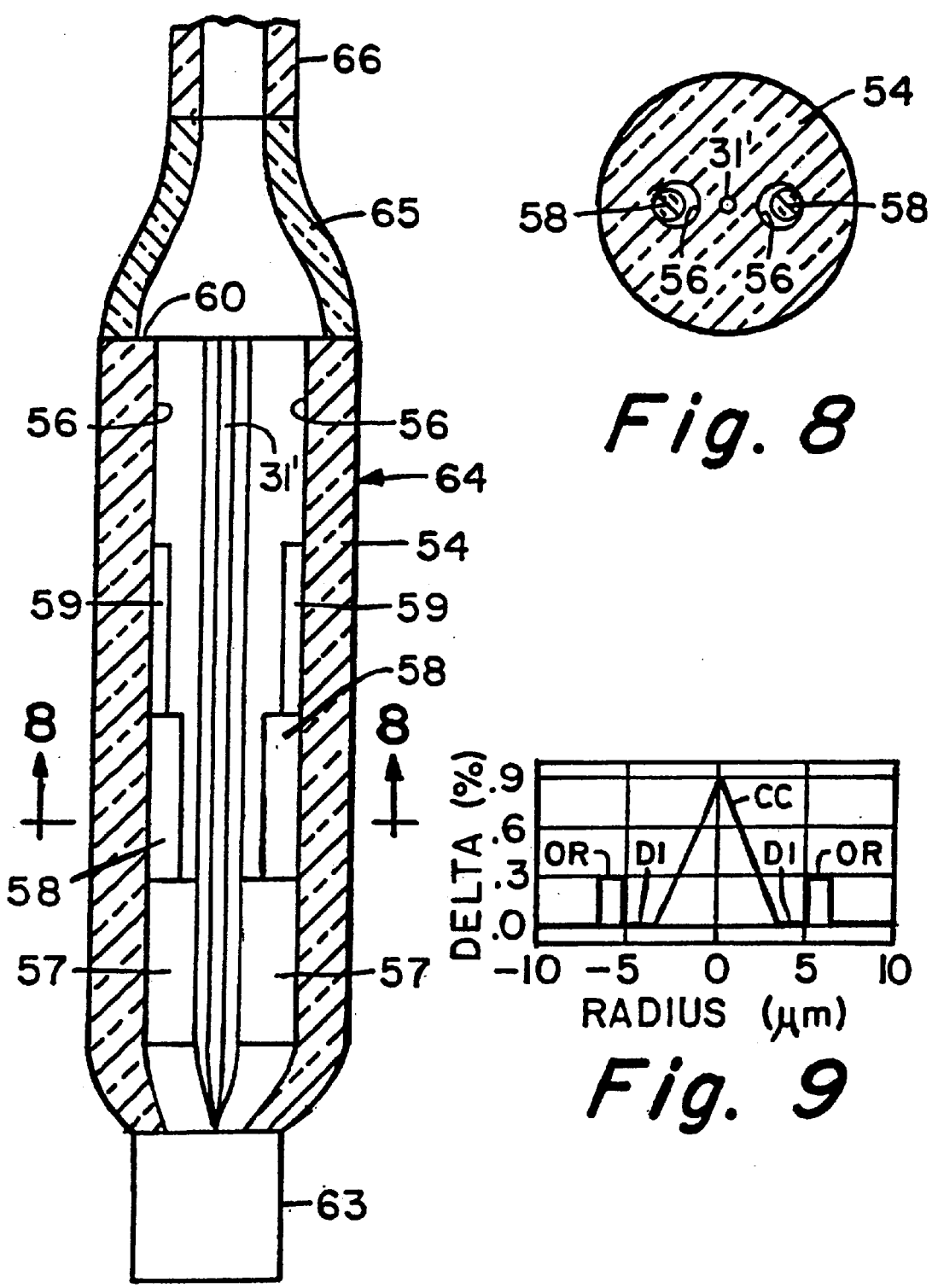

ns with 5 the range of 5 to 5 km. Soliton transmission becomes practical at bit
ELLIPTICAL CORE FIBER WITH AXIALLY DECREASING ASPECT RATIO AND METHOD This application is a 371 of PCT/US97/06001 filed Apr. 11, 1997, and also claims benefit of Provisional No. 60/015,998 filed Apr. 23, 1996.

BACKGROUND OF THE INVENTION

The present invention relates to high data rate optical fibers for telecommunication systems and to methods of making such fibers.

It has been known that solitons can be generated in optical fibers when the transmission power is in the nonlinear region. The optical soliton maintains its narrow temporal pulse as it propagates down the fiber because the dispersion is balanced with the nonlinear index. Mathematically this phenomenon is adequately described with the well known nonlinear Schroedinger equation. See, for example, the publication, C. Sien, "Concatenated Soliton Fibre Link", Electronics Letters, volume 12, pages 237–238 (1991). There are three important terms in the nonlinear Schroedinger equation. These terms relate to attenuation, the group velocity dispersion and the nonlinear index effects. The balancing of the group velocity dispersion with the nonlinear index term has received much attention to date and is well known. However, pulses propagating in real fibers undergo attenuation; this can cause soliton pulses to develop frequency chirping and subsequent broadening and to then become essentially linear.

As used herein the term "dispersion" means group velocity dispersion, which is the total of the material dispersion and the refractive index profile dispersion.

It has been proposed that a soliton can survive in a fiber with loss if the group velocity dispersion can be made to decrease approximately exponentially with distance (K. Tajima, "Compensation of Soliton Broadening in Nonlinear Optical Fibers with Loss", Optics Letters, volume 12(1), pp. 54–56, 1987). In this way, the group velocity dispersion is made to continuously change so that it matches the changing power level. That publication states that this can be accomplished by varying the core diameter through fiber tapering and that such a fiber can be manufactured by controlling the fiber draw speed. Such a fiber is illustrated in FIG. 1 wherein the diameter of fiber 3 exponentially decreases from the large diameter input end 4 to the small diameter output end 5. The diameter of the core of fiber 3 is proportional to the outside diameter of the fiber. In the theoretical example proposed by Tajima the effective core diameter of such a fiber changes exponentially from about 10 µm to about 5 µm over 100 km.

A dispersion decreasing fiber was actually made by varying the speed of the fiber draw to change the fiber outer diameter from 175 µm to 115 µm, whereby the measured dispersion decreased from 10 ps/nm-km to 1 ps/nm-km over a 1 km length (V. A. Bogatyrev et al., "A single-mode fiber with chromatic dispersion varying along the length", Journal of Lightwave Technology, volume 9(5), pages 561–566, 1991). Subsequently, that fiber was used to generate a continuous soliton pulse train at 70 Gb/s (S. V. Chernikov, "70 Gbit/s fibre based source of fundamental solitons at 1550 nm", Electronics Letters, volume 28(13), pages 1210–1211, 1992).

Dispersion decreasing fibers have potential application in ultrahigh bit rate telecommunication systems. Dispersion decreasing fibers having lengths of about 100 m to 10 km can be employed in pulse compression systems employed in the generation of high bit rate soliton input signals. FIG. 2 schematically illustrates a part of a soliton communication system wherein a high bit rate pulse train is input to amplifier 7 and coupled to dispersion decreasing fiber DDF-1. The dispersion decreases exponentially with length between input end a and output end b of fiber DDF-1. After propagating a distance that is limited by the maximum dispersion change, the optical signal is again amplified at amplifier 8 and coupled to a similar dispersion decreasing fiber DDF-2, which has a high dispersion end a adjacent amplifier 8 and a low dispersion end b adjacent amplifier 9. The proposed length of fiber DDF-1 and DDF-2 is about 1–100 km. Soliton transmission becomes practical at bit rates greater than 10 Gbps.

In addition to enabling the transmission of high data rates, soliton transmission can increase the length of fiber over which the signals can be transmitted without amplification. Thus, the distances between amplifiers 7 and 8 and between amplifiers 8 and 9 could be extended by employing appropriate dispersion decreasing optical fiber.

A tapered fiber, in which the outside diameter as well as the core diameter changes to the extent proposed in the Tajima and Bogatyrev et al. publications, will introduce splicing, testing and cabling problems. As the outer fiber diameter varies, the diameter of one end of the fiber would be larger than that of a standard single-mode telecommunication fiber; this could cause problems when automatic fusion splicing equipment is employed. Moreover, the large core diameter end of the fiber would have a mode field diameter larger than that of a standard fiber, thus introducing an unacceptable splice loss. The proof test operation is somewhat complicated since a constant diameter is assumed by present proof test machines. Also, the calculation of installed stress for bent fibers is complicated by the variation in cross-sectional area along the fiber length.

SUMMARY OF THE INVENTION

It is therefore an object of the present invention to provide an optical fiber in which the dispersion varies along the length thereof, while the outside diameter of the fiber is substantially constant. Another object is to provide a decreasing dispersion optical fiber that exhibits a small change in mode field diameter with respect to dispersion. A further object is to provide a method of making a dispersion decreasing optical fiber in which the area of the core is substantially constant throughout the length of the fiber. Yet another object is to provide a method of making an elliptical core optical fiber having a longitudinally variable aspect ratio.

Briefly, the present invention relates to a single-mode optical fiber having an elliptical core that is surrounded by cladding glass. The core has a given aspect ratio at one end of the fiber and an aspect ratio smaller than the given aspect ratio at the other end of the fiber. The aspect ratio continuously varies between the two ends. The length of the fiber is preferably at least 100 meters.

The fiber of this invention can be employed as a soliton propagation fiber for transmitting a high bit rate pulsed optical signal.

This invention also concerns a method of making an optical fiber. A glass draw blank having core and cladding regions is formed. The cladding region includes longitudinally-extending apertures that are diametrically opposed with respect to the core region. The cross-sectional area of the void space within the apertures varies with respect to longitudinal distance along the apertures. The resultant draw blank is drawn to close the apertures and to form an optical fiber having an elliptical core. The core aspect ratio of a given region of elliptical core fiber is a function of the area of the void space within the apertures at that region of draw blank that produces the given region of fiber.

BRIEF DESCRIPTION OF THE DRAWINGS

FIG. 7 is a cross-sectional view of a draw blank for drawing elliptical core optical fiber having lengths of different aspect ratio.

FIG. 8 is a cross-sectional view taken along lines 8—8 of FIG. 7.

FIG. 9 is a refractive index profile of a dispersion shifted single-mode optical fiber.

DESCRIPTION OF THE PREFERRED EMBODIMENTS

In potential applications of dispersion-decreasing fiber, it is desirable to achieve a controlled variation in dispersion between the input and output ends of the fiber. Additionally, for soliton transmission, the dispersion must remain positive and become very small or reach zero at the output end of the fiber. Other fiber characteristics such as mode field diameter must be considered, since refractive index modifications that affect dispersion can also affect mode field diameter.

The dispersion decreasing optical fiber of the invention has an elliptical core (when viewed in a plane perpendicular to the central longitudinal axis of the fiber). The aspect ratio of such a fiber is b/a, where b and a are the semi-major and semi-minor axes, respectively, of the elliptical core. The aspect ratio is largest at the input end of the dispersion decreasing fiber, and it decreases toward the output end thereof. This provides the required monotonic change from a relatively large dispersion at the input end to a relatively low or zero dispersion at the output end. The cross-sectional shape of the core at the output end of the fiber can be circular, i.e. b/a is equal to one.

Figure 1:
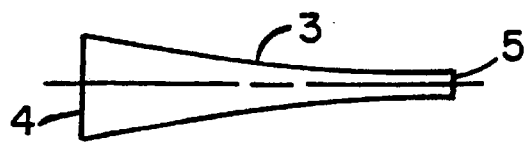
FIG. 1 is a schematic illustration of a prior art optical fiber for soliton propagation.
Figure 2:
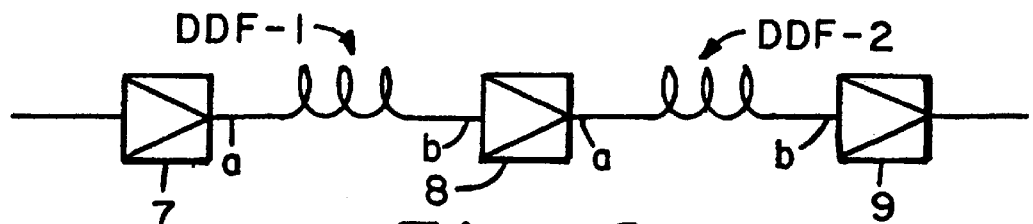
FIG. 2 schematically depicts a soliton communication system employing dispersion decreasing optical fibers.
Figure 3:
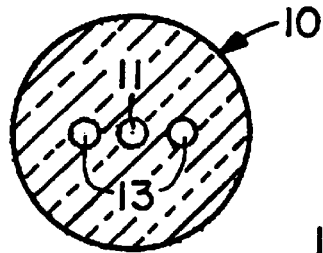
FIG. 3 is a cross-sectional view of a preform from which an elliptical core fiber can be drawn.
Figure 4:
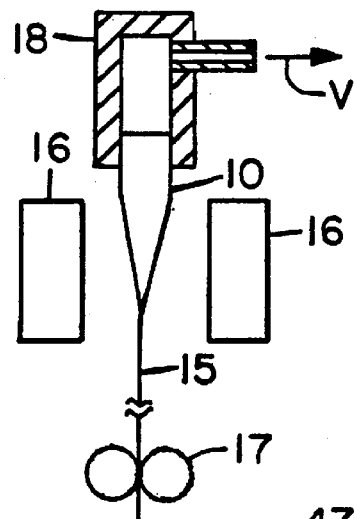
FIG. 4 is a schematic diagram illustrating the drawing of an elliptical core fiber from the preform of FIG. 3.
Figure 5A:
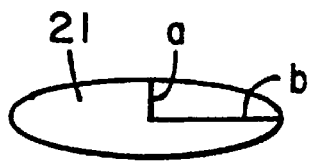
FIG. 5a is a diagram showing the semi-major axis and the semi-minor axis of the elliptical core.

A method for forming an elliptical fiber is disclosed in U.S. Pat. No. 5,149,349 which is incorporated herein by reference. Referring to FIGS. 3 and 4, cylindrical draw blank 10 has core and cladding regions 11 and 12, respectively. The core and cladding regions may be formed of conventional materials employed in the formation of optical fibers. The salient characteristics of these materials are that the refractive index of the core material must be greater than that of the cladding material and that both materials must exhibit low losses at the wavelength at which the waveguide is intended to be operated.

Apertures 13 extend longitudinally through blank 10 parallel to the central longitudinal axis of core region 11. While apertures 13 are illustrated as being circular in cross-section, the cross-sectional configuration could be other than circular.

To draw an elliptical core fiber having a longitudinally constant aspect ratio, draw blank 10 is placed in a conventional draw furnace (FIG. 4) where tractors 17 pull fiber 15 from the bottom portion of blank 10 which is heated to draw temperature by heating elements 16. The tendency for apertures 13 to close is a function of draw rate and glass viscosity. The viscosity of the draw blank root from which the fiber is drawn depends upon furnace temperature and glass composition. If the viscosity of the heated portion of the blank is sufficiently low and the draw rate is sufficiently low, apertures 13 will naturally close during the draw process. Since the apertures more readily close if they are evacuated, draw speed can be increased by affixing a vacuum attachment 18 to the upper end of the blank. Vacuum also reduces the possibility of core contamination by hydroxyl groups during the high temperature fiber draw step.

Figure 5:
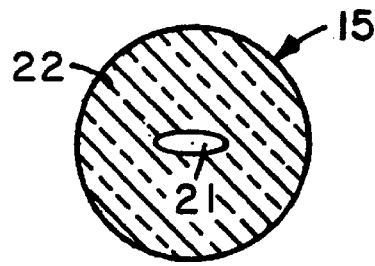
FIG. 5 is a cross-sectional view of an elliptical core fiber produced by the method of FIGS. 3 and 4.

As apertures 13 close, they are replaced by the surrounding glass. When glass at smaller radii than the apertures flows radially outwardly into the apertures, core region 11 becomes elongated in cross-section. The resultant elliptical core fiber 15, the cross-section of which includes cladding 22 and oblong core 21, is shown in FIG. 5. The ellipticity or aspect ratio of the elliptical core depends upon the size of apertures 13 and the spacing between those apertures and the core. Assume that apertures 13 in draw blank 10 have a cross-sectional area A and that they are spaced a distance S from core 11. Assume further that these parameters result in a core ellipticity of X:1. If S is increased, and all other parameters remain the same, fiber core ellipticity will be less than X:1. If A is increased, and all other parameters remain the same, core ellipticity will be greater than X:1. Suitable values of ellipticity can be obtained with values of A and S that are sufficiently small that the drawn fiber retains the circular shape of the preform. Circular fibers are preferred for certain applications. Ellipticity could also be X:1 at some spacing slightly greater than S and some area slightly greater than A. U.S. Pat. No. 5,149,349 discloses a method of making the draw blank of FIG. 3 wherein (a) apertures 13 are parallel to the core throughout the longitudinal axis of the draw blank, and (b) the cross-sectional area of apertures 13 and their spacing from the core are longitudinally uniform in order to provide fiber 15 with uniform properties throughout its length. A modification of that method was employed to form a plurality of optical fibers having different core aspect ratios. That study revealed that dispersion at a given wavelength is a function of aspect ratio.

Figure 6:
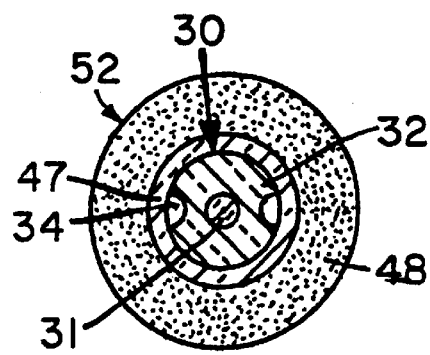
FIG. 6 is a cross-sectional view of a preform that can be processed to form the draw blank of FIG. 3.

A method of making a draw blank for the aforementioned study is illustrated in FIGS. 6–8. Referring to FIG. 6, a glass single-mode core preform 30 was initially formed, i.e. a preform in which the ratio of the diameter of core 31 to the diameter of cladding 32 is greater than that which is required to draw a single-mode fiber from the preform. In order to form a single-mode optical fiber from such a core preform 30, it is conventionally overclad with additional cladding glass to provide the desired ratio of core diameter to cladding diameter.

Since solitons require low loss operation, it is preferable to operate in the 1550 nm region of the electromagnetic spectrum where silica based optical fibers exhibit extremely low loss. Dispersion-shifted fiber made in accordance with the teachings of U.S. Pat. No. 4,715,679 can be designed for zero dispersion at about 1550 nm. Dispersion-shifted fiber is further discussed in the publications: T. D. Croft et al. "Low-Loss Dispersion-Shifted Single-Mode Fiber Manufactured by the OVD Process", Journal of Lightwave Technology, Volume LT-3, No. 5, October 1985, pp. 9313–934; and V. A. Bhagavatula et al. "Bend-Optimized Dispersion-Shifted Single-Mode Designs", Journal of Lightwave Technology, Volume LT-3, No. 5, October 1985, pp. 954–957.

FIG. 9 illustrates the refractive index profile of a typical, commercially available dispersion shifted fiber exhibiting zero dispersion at 1550 nm. The fiber core comprises a central core region CC that is separated from an outer ring OR by a region DR of depressed refractive index. The diameter of the central triangular region CC is 7.20 $\mu$m, and the inner and outer diameters of ring OR are 10.08 $\mu$m and 12.94 $\mu$m, respectively. The peak refractive index values of regions CC and OR (expressed as $\Delta_p$) are 0.9% and 0.3%, respectively. The term $\Delta_p$ is the relative refractive index of the core with respect to that of the cladding and is given by $$\Delta_p = (n_1^2 - n_2^2)/2n_1^2$$

where $n_1$ is the peak refractive index of the core region and $n_2$ is the refractive index of the cladding. For simplicity of expression, $\Delta$ is often expressed in percent, i.e. one hundred times $\Delta$. It is noted that some processes for producing optical fibers result in a refractive index depression at the fiber centerline. In such a fiber, $n_1$ refers to the maximum refractive index of the central core region rather than at the center line.

In order to achieve low loss, low dispersion operation in the 1550 nm region of the spectrum, a core preform of the above-described dispersion-shifted type (FIG. 9) was selected. Longitudinally-extending grooves 34 were ground in cladding 32 on opposite sides of core 31. After the grinding operation, the grooved preform is preferably etched and rinsed to remove particulate matter. The diameter of the grooved core preform was initially made too large for subsequent processing; it was therefore inserted into a conventional draw furnace where it was stretched to reduce its diameter to about 18.5 mm.

Silica cladding tube 47 had inside and outside diameters of 19 mm and 25 mm, respectively. An end of a cladding tube 47 was tapered, and a glass plug 63 was fused to the tapered end. The ends of tube 47 were then mounted in a lathe where it was rotated and translated with respect to a soot deposition burner. Particles of silica soot were deposited on tube 47 to build up porous coating 48.

Grooved core preform 30 was inserted into the end of tube 47 opposite the tapered end until it contacted the tapered end, thereby forming assembly 52. The end of tube 47 into which preform 30 was inserted was then tapered and fused to a handle suitable for supporting assembly 52 in a consolidation furnace. Assembly 52 was lowered into a consolidation furnace where it was subjected to a drying gas mixture of chlorine and helium and then sintered.

Figure 10:
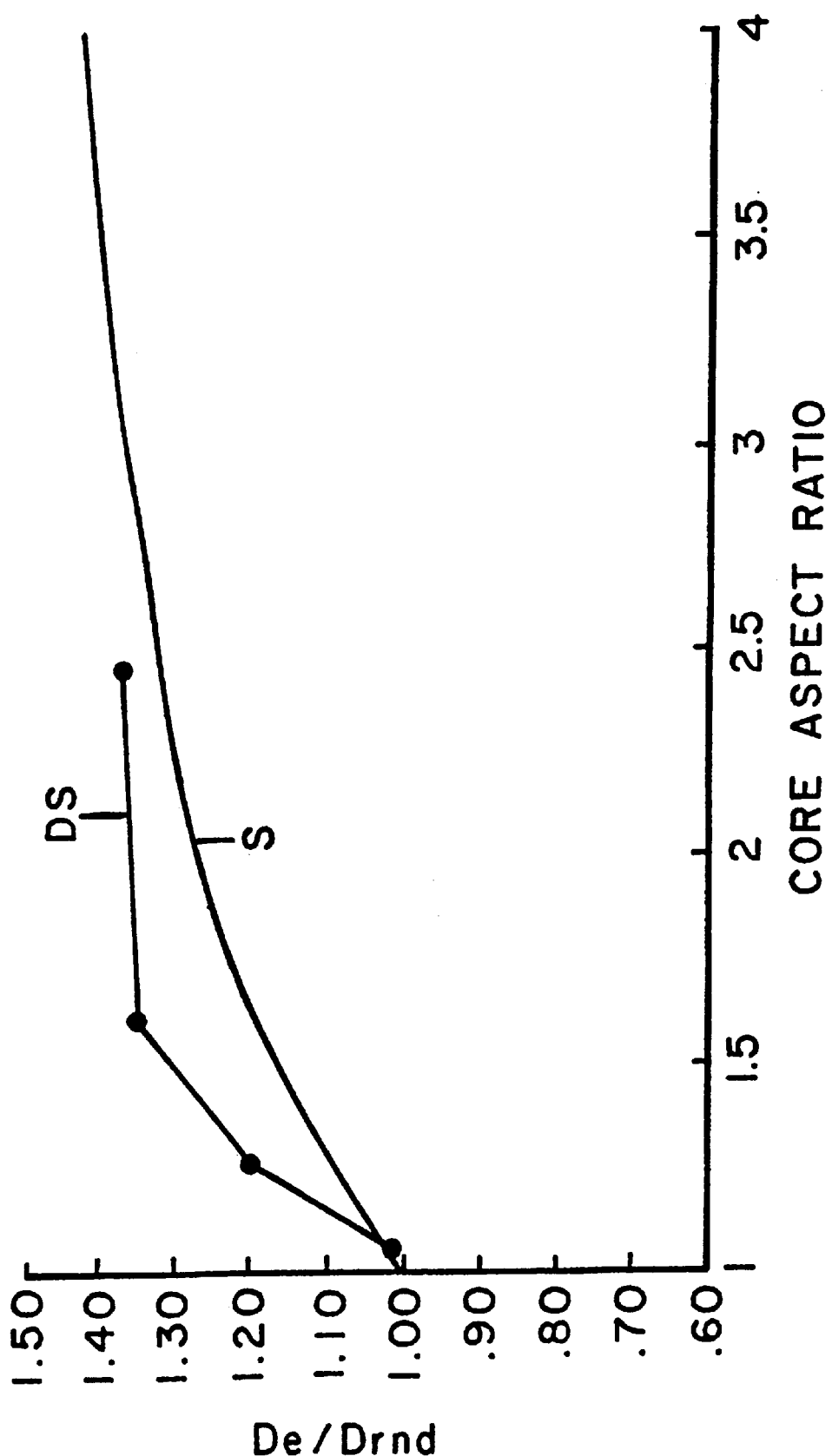
FIG. 10 is a graph of the normalized dispersion ($D_e/D_{rnd}$) versus core aspect ratio.

As coating 48 consolidates, it exerts a force radially inwardly on tube 47, thereby forcing that tube inwardly against preform 30. The resultant consolidated assembly comprises a core surrounded by cladding. The original cladding region 32 and tube 47 are completely fused together, and porous coating 48 has become completely sintered and fused to tube 47. During the high temperature consolidation step, the grooves become rounded and form apertures 56 as shown in FIG. 10.

One end of consolidated assembly 64 (the top of FIG. 7) was cut off so that the silica rods could be inserted.

Silica rods 57, 58 and 59, which were circular in cross-section, were sequentially inserted into apertures 56. Rods 57 could not drop farther than the position shown since the ends of the apertures 56 were tapered. After the rods were inserted, tapered tube 65 was fused to the end of assembly 64, and handle 66 was fused to tube 65. The upper ends of apertures 56 between rods 59 and end 60 of the consolidated assembly remained empty. The cross-sectional areas of rods 58 were larger than those of rods 59, and the cross-sectional areas of rods 57 were larger than those of rods 58. The fill factor for a given rod is the ratio of the cross-sectional area of aperture 56 to that of the rod. The cross-sectional area of rods 57 was large enough to substantially completely fill apertures 56, whereby its calculated fill factor is 1.0. The fill factors for rods 58 and 57 are 0.671 and 0.34, respectively. The fill factor for the empty upper region apertures 56 is zero.

The resultant draw blank 64 was inserted into a draw furnace, and a vacuum attachment was connected to handle 66 to evacuate the apertures. Optical fiber was then drawn from the preform.

A section of fiber resulting from that portion of the draw blank that contained contained rods 57 (fill factor=1) was wound on spool 12. Sections of fiber resulting from those portions of the draw blank that had calculated fill factors of 0.671, 0.34 and 0 were wound on spools numbered 14, 16 and 21, respectively (see Table 1).

Some of the characteristics of the single-mode, dispersion-shifted optical fibers drawn from draw blank 64 of FIG. 7 are listed in Table 1 wherein dispersion is in psec/nm·km.

TABLE 1

| Spool at No. nm | Calc. Fill Factor | Length (m) | Aspect Ratio | Disp. @ 1550 nm | $D_e/D_{rnd}$ | MFD 1500 |
|---|---|---|---|---|---|---|
| 12 | 1 | 2000 | 1.05 | 3.88 | 0.99 | 7.6 |
| 14 | 0.671 | 3400 | 1.26 | 4.68 | 1.19 | 7.65 |
| 16 | 0.34 | 1000 | 1.61 | 5.28 | 1.34 | 7.65 |
| 21 | 0 | 5150 | 2.45 | 5.36 | 1.36 | 8.08 |

Table 1 shows that dispersion at 1550 nm increases with increased aspect ratio.

The effect of core ellipticity on dispersion is illustrated in FIG. 10 where $D_e/D_{rnd}$ is plotted as a function of aspect ratio. The terms "$D_e$" and "$D_{rnd}$" refer to the dispersion of elliptical core and round core fibers, respectively. Curve DS refers to the measured dispersion shifted fiber, and curve S refers to results that were calculated for a step index fiber.

Table 1 shows that mode field diameter (MFD) is not a strong function of aspect ratio. This means that a properly designed decreasing dispersion fiber would not suffer differing splice losses due to mode-field diameter mismatches with a standard fiber.

In order to draw a fiber having a dispersion that gradually decreases from one end to the other at a given wavelength, the core aspect ratio must also gradually decrease. This can be accomplished by drawing the fiber from a draw blank having apertures on opposite sides of the core, the cross-sectional area of the void region within the aperture decreasing from one end to the other.

Figure 11:
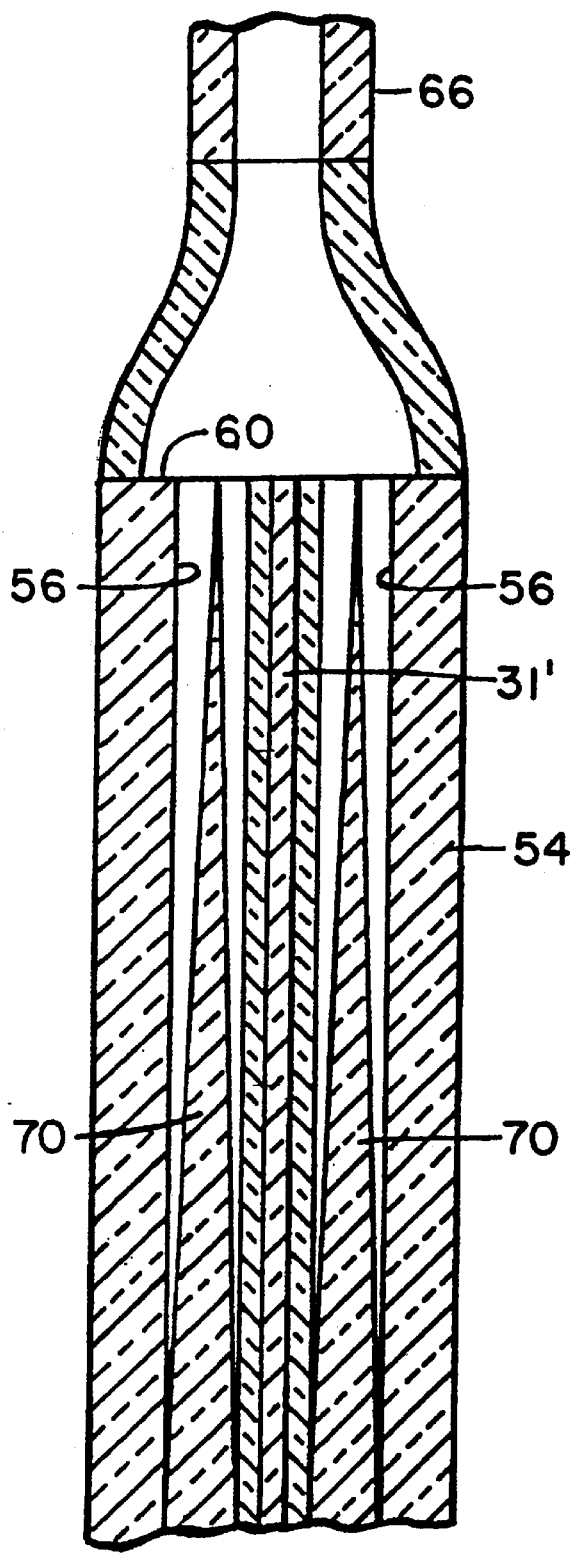
FIG. 11 is a cross-sectional view of a draw blank for drawing elliptical core optical fiber having a continually changing aspect ratio.

A suitable preform for drawing single-mode dispersion decreasing optical fiber is shown in FIG. 11, wherein elements similar to those of FIG. 7 are represented by the same reference numeral. Tapered cladding glass rods 70 are inserted into into apertures 56, and the resultant draw blank is drawn as described above in conjunction with FIG. 7. Rods 70 preferably have the same composition as cladding region 54. For example, both rods and cladding could be formed of pure silica.

The first drawn end of the fiber that results from the bottom portion 62 of the draw blank, wherein the fill factor is substantially equal to one, would have a substantially round core and thus exhibit the lowest dispersion. The core of the last drawn end of the fiber that results from the top portion 60, wherein the fill factor is substantially zero, would exhibit the greatest ellipticity and thus exhibit the greatest dispersion. As core ellipticity gradually increases between the first and last drawn ends of the fiber, the dispersion will also gradually increase.

Figure 12:
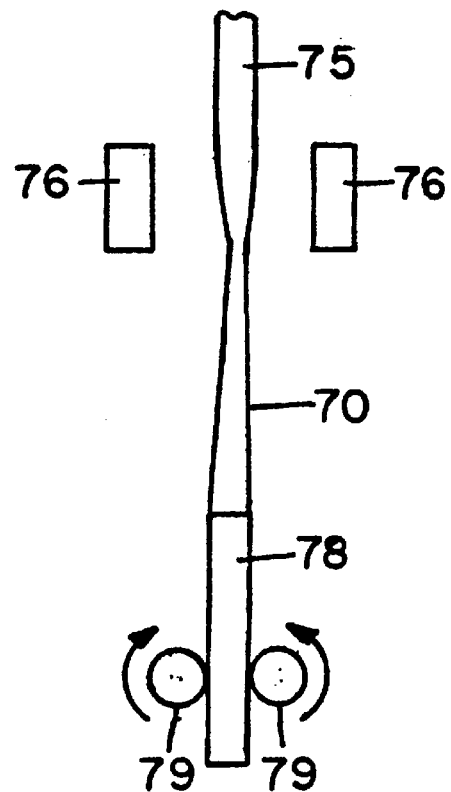
FIG. 12 is a schematic diagram illustrating the drawing of a multi-tapered glass rod.

Tapered rods 70 can be formed in a conventional draw furnace which is illustrated in FIG. 12. A glass cylinder 75 is suspended within the furnace where its tip is heated by means 76. One end of silica rod 78 is fused to the lower end of the cylinder, and the other end of the rod is engaged by motor-driven tractor 79. A tapered rod 70 is drawn by varying the speed of the tractors during the drawing operation. By appropriately varying tractor speed, any desired taper can be achieved, so that any desired relationship between dispersion and fiber length can be obtained.

Optical fiber is more efficiently drawn from large draw blanks. It might be desirable to draw a dispersion decreasing fiber having a length between 5 and 50 km, for example. It would be costly to draw a single fiber having a length within that range from a single draw blank of the type shown in FIG. 11.

Figure 13:
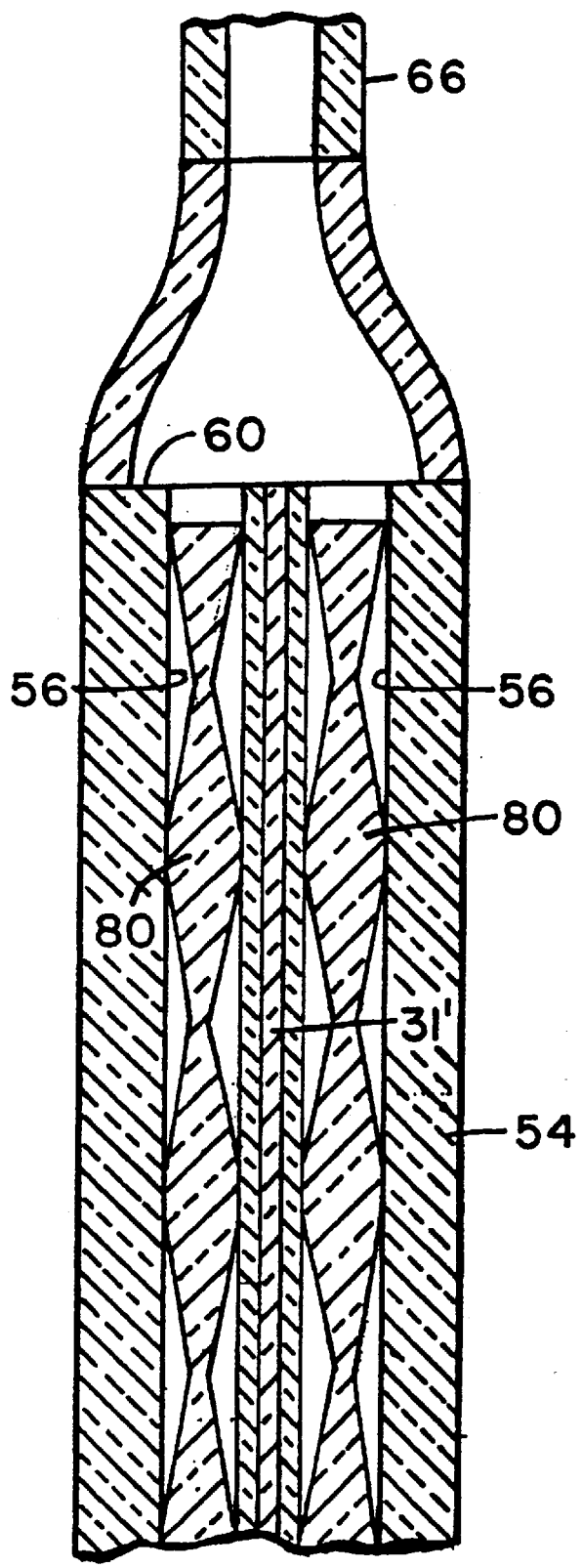
FIG. 13 is a cross-sectional view of a modified draw blank.

A draw blank capable of drawing many dispersion decreasing fibers is shown in FIG. 13, wherein elements similar to those of FIG. 7 are represented by the same reference numeral. Each of the glass rods 80 is multi-tapered, each taper being capable of forming a single dispersion decreasing fiber. In the embodiment shown, six lengths of dispersion decreasing fiber could be drawn.

Figure 15:
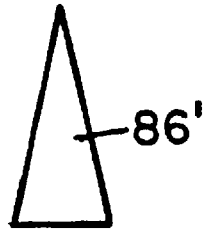
FIG. 15 shows a nonlinearly tapered glass rod.
Figure 14:
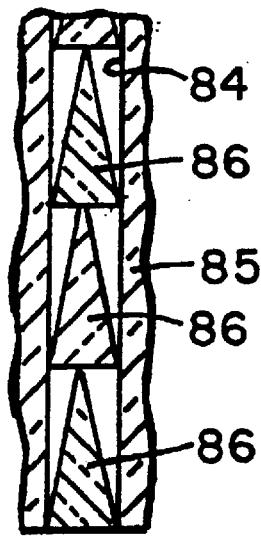
FIG. 14 is a fragmentary cross-sectional view of a yet another embodiment.

FIG. 14 shows that separate tapered rods 86 could be stacked in the apertures 84 of the draw blank cladding region 85. FIG. 15 shows that the rods can be nonlinearly tapered.

What is claimed is:

1. An optical fiber comprising an elliptical core surrounded by cladding glass, said core having a given aspect ratio at one end of the fiber and an aspect ratio smaller than said given aspect ratio at the other end of said fiber, said aspect ratio continuously varying between said two ends.

2. The fiber of claim 1 wherein the length of said fiber is at least 100 meters.

3. An optical fiber comprising an elliptical core surrounded by cladding glass, said core having a given aspect ratio at one end of the fiber and an aspect ratio smaller than said given aspect ratio at the other end of said fiber, the length of said fiber between said two ends being at least 100 meters and the diameter of said fiber being substantially constant.

4. The fiber of claim 3 wherein the length of said fiber is at least 1 km.

5. A soliton propagation fiber for transmitting a high bit rate pulsed optical signal, said fiber comprising an elliptical core surrounded by cladding glass, said core having a given aspect ratio at one end of the fiber and an aspect ratio smaller than said given aspect ratio at the other end of said fiber.

6. The fiber of claim 5 wherein the length of said fiber is at least 1 km.

7. A method of making an optical fiber comprising the steps of forming a glass draw blank having a core region, a cladding region surrounding said core region, and longitudinally-extending apertures in said cladding region diametrically opposed with respect to said core region, the cross-sectional area of the void space within said apertures varying with respect to longitudinal distance along said apertures, and drawing the resultant draw blank to close said apertures and form an optical fiber having an elliptical core, the core aspect ratio of a given region of elliptical core fiber being a function of the area of the void space within said apertures at that region of draw blank that produces said given region of fiber.

8. The method of claim 7 wherein the cross-sectional area of said void space increases in steps along the longitudinal axis of said draw blank.

9. The method of claim 7 wherein the step of forming comprises forming a glass draw blank having a core region, a cladding region surrounding said core region, and cylindrically-shaped longitudinally-extending apertures in said cladding region diametrically opposed with respect to said core region, the cross-sectional area of each of said apertures being substantially constant along its longitudinal length, and inserting a glass rod into each aperture, said rod having a non-uniform cross-sectional area along its length, the difference between said substantially constant cross-sectional area of said aperture and the cross-sectional area of said rods at any longitudinal position along said draw blank constituting the area of the void space at that position.

10. The method of claim 9 wherein the cross-sectional area of said rods decreases from rod to rod along the longitudinal axis of said draw blank.

11. The method of claim 9 wherein the step of forming comprises forming longitudinal grooves on diametrically opposed sides of a cylindrically-shaped core preform having a glass core surrounded by cladding glass, depositing glass particles on the outer surface of a glass tube, inserting said core preform into said glass tube, heating the resultant assembly to consolidate said particles, thereby exerting on said tube a radially inwardly directed force that causes said heated tube to shrink onto and fuse to said core preform, thereby forming a consolidated assembly having longitudinal apertures that are parallel to said core, and inserting said glass rods into said apertures.

12. The method of claim 9 wherein the refractive index of said rods is substantially the same as that of said cladding glass.

13. The method of claim 7 wherein, prior to the step of drawing, said method comprises evacuating said apertures.

* * * * *